Patented Oct. 2, 1923.

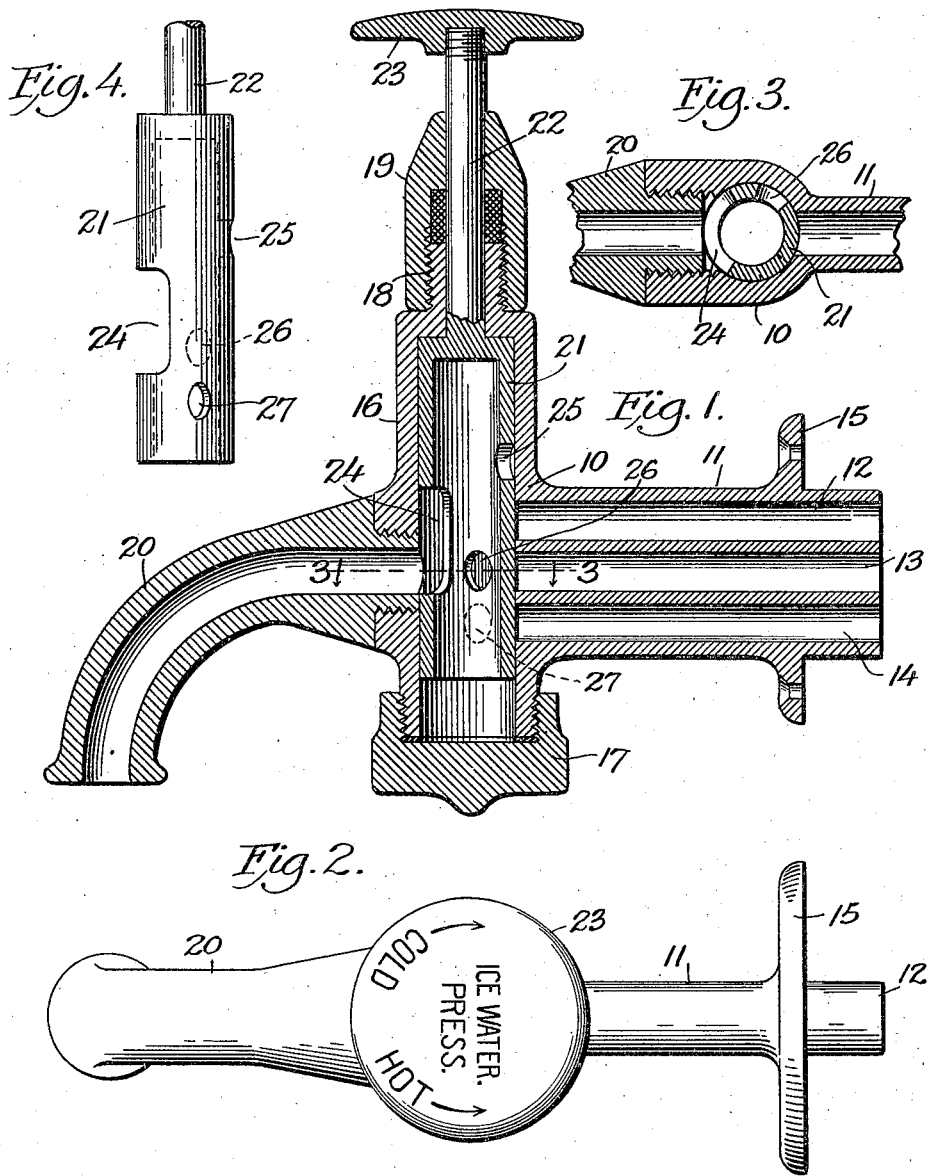

1,469,612

UNITED STATES PATENT OFFICE.

AUGUST T. J. BAHR, OF MURPHYSBORO, ILLINOIS, ASSIGNOR, BY DIRECT AND MESNE ASSIGNMENTS, OF ONE-FOURTH TO RAYMOND A. HATFIELD, ONE-FOURTH TO JAMES J. GALLAGHER, THREE-EIGHTHS TO FRED HEIBERG, AND ONE-EIGHTH TO CHARLES FRANKS, ALL OF ST. LOUIS, MISSOURI.

THREE-WAY FAUCET.

Application filed November 17, 1921. Serial No. 515,743.

*To all whom it may concern:*

Be it known that I, AUGUST T. J. BAHR, a citizen of the United States of America, residing at Murphysboro, in the county of Jackson and State of Illinois, have invented certain new and useful Improvements in Three-Way Faucets, of which the following is a specification.

My present invention relates generally to valves and more particularly to valves of the turning plug type, my object being the provision of a three-way faucet to control the supply of hot and cold water and iced water in hotels and the like which will be simple and easy to operate, of economical and durable construction, and may be readily maintained in properly operating and sanitary condition.

According to my invention all parts are constructed and connected in such manner that disassembly and thorough cleaning is facilitated to the highest extent.

In the accompanying drawing, which illustrates the invention and forms a part of this specification, Figure 1 is a vertical longitudinal section taken centrally through my improved valve.

Figure 2 is a top plan view thereof.

Figure 3 is a detail horizontal section taken on line 3—3 of Figure 1, and

Figure 4 is a detail side view of the cylindrical turning plug.

Referring now to these figures, the body 10 of my improved faucet has a rear portion 11 in which are a series of horizontal, vertically-alined fluid channels 12, 13 and 14 connected in practise to pipes for supplying iced water, cold water and hot water. This rear portion 11 also has an annular rib or flange 15 near its rear end to abut any suitable support against which the faucet is mounted in use.

At its forward portion, the body 10 has a vertical cylindrical valve chamber 16 with which the forward ends of the fluid channels 12, 13 and 14 communicate at vertically spaced points. The lower portion of the cylinder below the rear portion 11 is externally threaded and normally closed by means of a cap 17 capable of ready removal, and the upper reduced end 18 of the cylinder is externally threaded to receive a gasket nut 19.

Intermediate its ends, and preferably at a point diametrically opposite to the central fluid channel 13, the cylinder 16 has an internally threaded aperture which receives the reduced and threaded inner end of an outwardly and downwardly curved discharge spout 20 which, like the lower cap 17 and the upper gasket nut 19, is readily detachable.

Within the chamber of cylinder 16, a cylindrical valve 21 is both rotatable and vertically shiftable, its upper end having a vertical stem 22 which projects upwardly through the gasket nut 19 and is threaded at its upper end to receive a handle 23 preferably marked as shown in Figure 2 so that the manner of manipulating the valve will be plain even to those unfamiliar with its operation.

Adjacent to the inner end of the discharge spout 20, the wall of valve 21 is cut away as at 24 to form a registering aperture elongated both vertically and circumferentially for a purpose to be presently described. The valve wall also has an aperture 25 diametrically opposite to and above the cut away portion 24 and which, in the normal upper position of the valve, is above the iced-water channel 12. Below this aperture 25 are openings 26 and 27, located upon relatively opposite sides of the vertical plane of aperture 25 and respectively in the horizontal plane of the cold and hot water channels 13 and 14, when the valve is in its normal upper position.

Thus, in operation by pressing downwardly upon the handle 23 to lower valve 21, the aperture 25 is shifted into alinement with the iced-water channel 12 to bring about discharge of iced water through the discharge spout 20, which may be cut off by again lifting the handle. If cold water is desired, the handle 23 is turned clockwise until aperture 26 registers with the cold water channel 13 while if hot water is desired, the handle is turned counter-clockwise until aperture 27 registers with the hot water channel 14.

It will be understood that to prevent leakage the valve 21 forms a ground joint throughout its length within the cylindrical valve chamber, so that the friction of this close uniform fit and that of packing within the gasket nut 19 around the stem 22 will effectively hold the valve in any position until again shifted by the operator.

By virtue furthermore, of the removal of cap 17, gasket nut 19 and handle 23, it is obvious that the valve 21 may be bodily removed for cleansing purposes and that when the valve is withdrawn through the lower end of its chamber and the discharge spout 20 is detached, the entire body of the faucet is open for thorough cleansing and may thus be readily maintained in sanitary condition.

I claim:

A faucet having a discharge spout, a vertical cylinder with which the spout communicates and from which it is detachable, a removable cap closing the lower end of the cylinder, a rearwardly projecting portion having upper, intermediate and lower fluid channels, opening into the cylinder, a gasket nut threaded on the upper end of the cylinder, a cylindrical valve of hollow form interfitting and vertically shiftable and rotatable within the cylinder, having a stem projecting upwardly through the gasket nut, and having an upper wall opening shiftable upon vertical movement of the valve into independent registry with the upper fluid channel and also having circumferentially spaced and vertically offset wall openings for registration with the intermediate and lower channels upon oppositely rotative movements of the valve, said valve also having an enlarged opening in its wall in constant registry with the discharge spout and having a blank section of its wall between its openings of sufficient area to close the several channels when the valve is in upper central position, and a handle at the upper end of the valve stem.

In testimony whereof I have affixed my signature.

AUGUST T. J. BAHR.